United States Patent [19]
Messina et al.

[11] Patent Number: 5,873,636
[45] Date of Patent: Feb. 23, 1999

[54] BALANCE WEIGHT RETENTION SYSTEM FOR VEHICLE WHEEL OR HUB

[75] Inventors: Paul R. Messina, Vandalia; John R. McKinley, Waynesville, both of Ohio

[73] Assignee: Dayton Walther Corporation, Dayton, Ohio

[21] Appl. No.: 811,399

[22] Filed: Mar. 4, 1997

Related U.S. Application Data

[60] Provisional application No. 60/012,816 Mar. 4, 1996.

[51] Int. Cl.$^6$ ....................................................... B60B 3/00
[52] U.S. Cl. ............................................................. 301/5.21
[58] Field of Search ................................ 301/5.21, 5.22; 295/6, 7; 74/573 R

[56] References Cited

U.S. PATENT DOCUMENTS

| | | | |
|---|---|---|---|
| 427,415 | 5/1890 | Griffin | 301/5.21 X |
| 1,667,344 | 4/1928 | Couture | 301/5.21 |
| 2,957,366 | 10/1960 | Driver et al. | 301/5.21 X |
| 3,017,224 | 1/1962 | Palmer | 301/5.21 |
| 3,799,618 | 3/1974 | Martinoli | 301/5.21 |
| 4,417,651 | 11/1983 | Lu | 301/5.21 X |
| 4,496,183 | 1/1985 | Kasper et al. | 295/7 |

*Primary Examiner*—Russell D. Stormer
*Attorney, Agent, or Firm*—MacMillan, Sobanski & Todd, LLC

[57] ABSTRACT

A balance weight retention system for a vehicle whcel or a vehicle hub including an inner portion and an outer portion having a non-threaded opening formed therethrough and a balance weight having a non-threaded opening formed therethrough. A fastener extends through the non-threaded opening of the balance weight and into the non-threaded opening of the outer portion of the wheel or hub to thereby secure the balance weight to the associated vehicle wheel or vehicle hub.

20 Claims, 7 Drawing Sheets

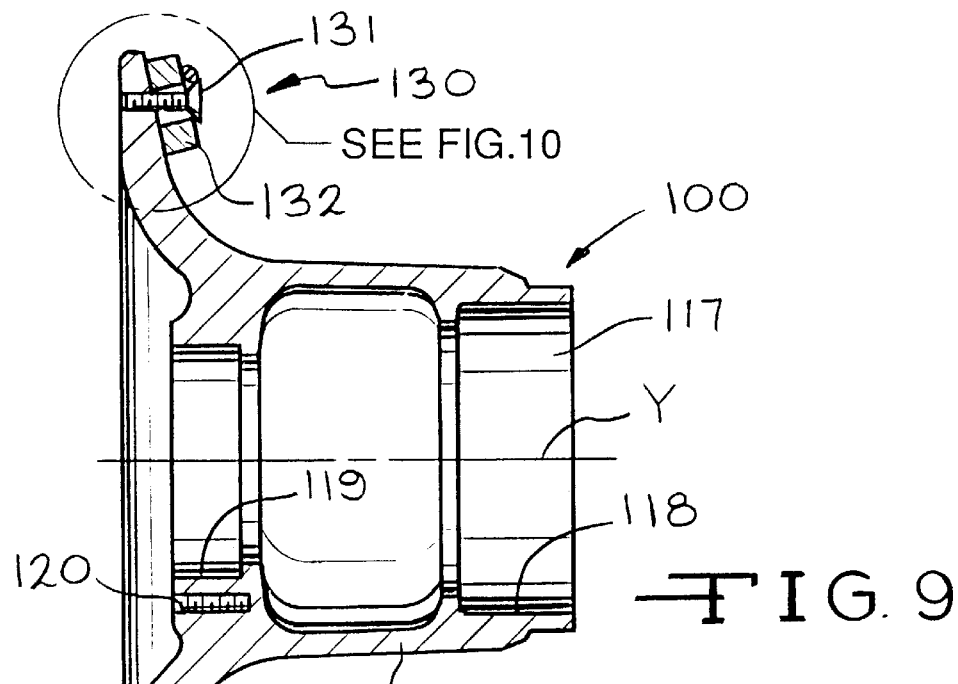
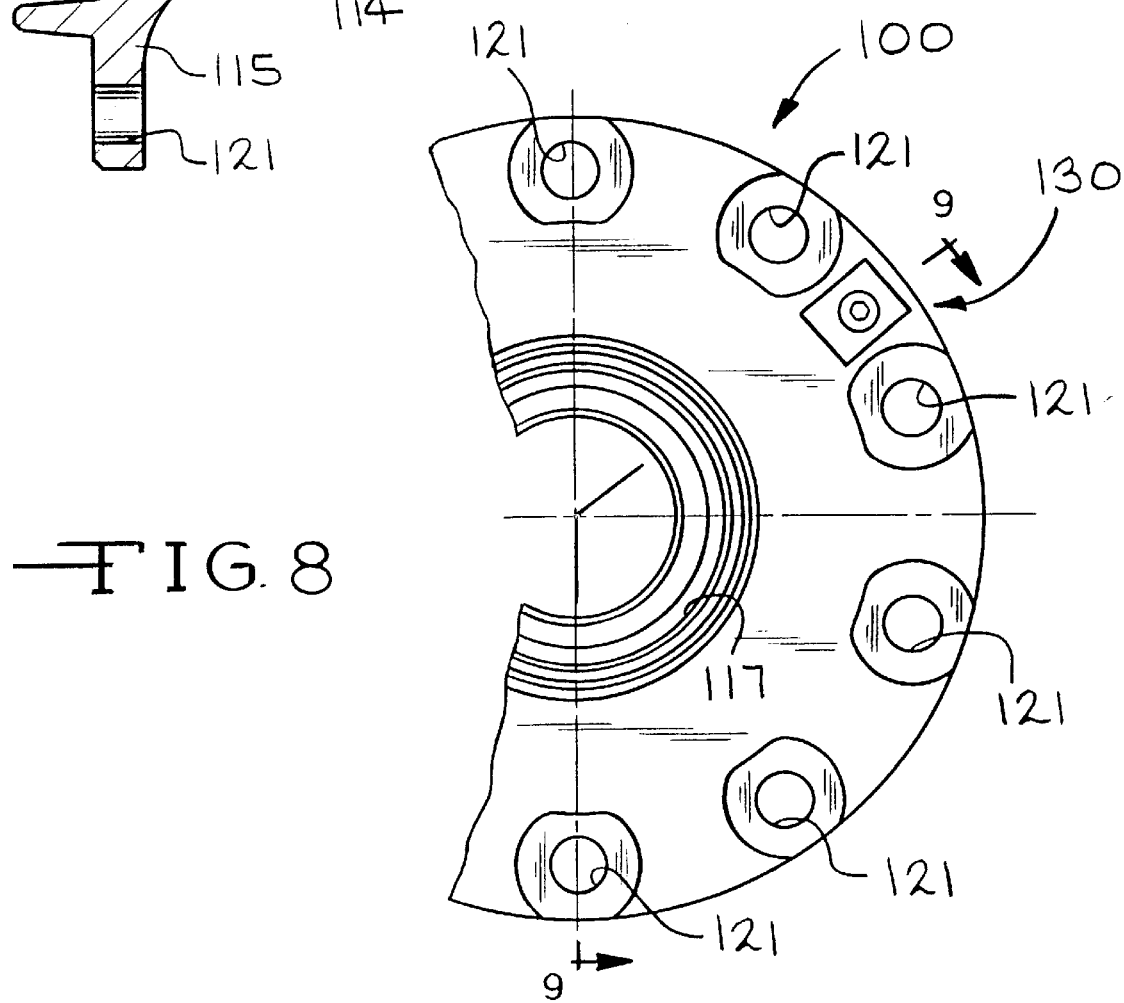

BALANCE WEIGHT RETENTION SYSTEM FOR VEHICLE WHEEL OR HUB

CROSS-REFERENCE TO RELATED APPLICATIONS

This application claims the benefit of U.S. Provisional Application No. Ser. 60/012,816, filed Mar. 4, 1996.

BACKGROUND OF THE INVENTION

This invention relates in general to vehicle wheels and hubs and in particular to an improved balance weight retention system adapted for use with such a vehicle wheel and hub.

Before a tire is mounted on a vehicle wheel, there typically exists an imbalance in the vehicle wheel. Also, after a hub is produced, there typically exists an imbalance in the hub. In order to correct the wheel and hub imbalance, one or more balance weights are usually attached to the associated wheel and hub. In a steel wheel or hub construction, a steel balance weight is typically secured to the steel wheel or hub by welding. However, in a nodular iron wheel or hub construction, it is not easy to weld the steel weight to the nodular iron wheel or hub. Thus, a threaded opening is usually provided in the nodular iron wheel or hub and a balance weight is secured to the associated wheel or hub using a fastener having a threaded end. It would be desirable to provide an improved vehicle wheel balance weight retention system which can be used with various kinds of wheel and hub constructions and which is easy to install and relatively inexpensive.

SUMMARY OF THE INVENTION

This invention relates to an improved balance weight retention system for use with a vehicle wheel or vehicle hub wherein an associated balance weight is secured to the vehicle wheel or vehicle hub without requiring threading of either the vehicle wheel or vehicle hub and the balance weight. In particular, a unique fastening system is used to secure the associated balance weight to the vehicle wheel or vehicle hub. According to various embodiments of this invention, the fastening system can include a rivet, a pin having a serrated end., a self-tapping screw, a pin which is separate from or integrally formed with the wheel or hub, and an adhesive.

Other advantages of this invention will become apparent to those skilled in the art from the following detailed description of the preferred embodiments, when read in light of the accompanying drawings.

BRIEF DESCRIPTION OF THE DRAWINGS

FIG. 8 is a view of a portion of a hub including a first embodiment of a vehicle hub balance weight retention system in accordance with this invention.

FIG. 9 is a sectional view taken along line 9—9 of FIG. 8.

DESCRIPTION OF THE PREFERRED EMBODIMENTS

Figure 1:
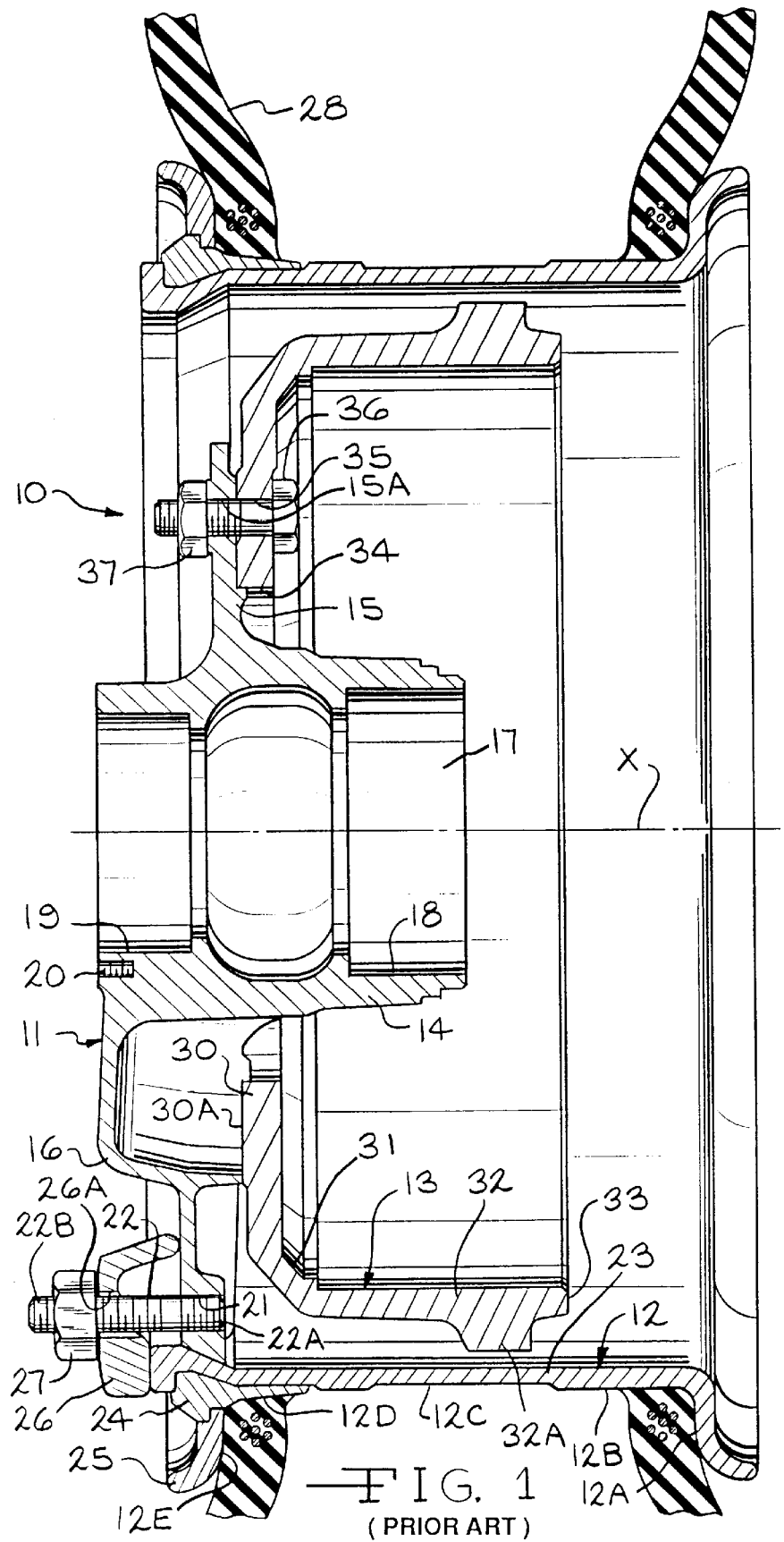
FIG. 1 is a sectional view of a portion of a prior art vehicle wheel and brake drum assembly.

Referring now to the drawings, there is illustrated in FIG. 1 a sectional view of a portion of a prior art vehicle wheel and brake drum assembly, indicated generally at 1. The illustrated prior art vehicle wheel and brake drum assembly 1 is adapted for use on a front spoke wheel of a heavy duty truck or tractor. However, it will be appreciated that the invention disclosed herein can be used in conjunction with other types of wheel constructions and/or other kinds of brake assemblies.

The prior art vehicle wheel and brake drum assembly 1 includes a wheel 11, a tire supporting rim 12 for carrying a tire 28, and a brake drum 13 connected to the wheel 11 for rotation therewith. In this embodiment, the wheel 11 is a cast or forged wheel formed from a suitable material, such as nodular iron, and defines an axis of rotation X. Alternatively, the wheel 11 can be formed from other metals, such as for example steel, aluminum, or alloys thereof. The wheel 11 includes an inner hub portion 14 and a generally radially extending outer portion 15 which includes a plurality of spokes 16 (only one spoke 16 being shown). The inner hub portion 14 of the wheel 11 includes centrally located opening 17 formed therethrough to allow an axle spindle (not shown) to extend therethrough. The inner hub portion 14 is provided with an inner bearing seat 18 and an outer bearing seat 19. The bearing seats 18 and 19 receive a pair of bearings (not shown) for rotatably supporting the axle spindle. The inner hub portion 14 of the wheel 11 further includes a plurality of threaded apertures 20 formed in an outer end thereof (only one threaded aperture 20 being shown). A cover plate (not shown) is secured to the inner hub portion 14 of the wheel 11 using fasteners (not shown) having threaded ends which are received in the threaded apertures 20.

The spoke 16 of the wheel 11 includes a plurality of threaded openings 21 formed therein (only one threaded opening 21 being shown). A plurality of rim studs 22 are provided, each having a threaded inner end 22A and a threaded outer end 22B. The threaded inner ends 22A of the rim studs 22 are received in the threaded openings 21 of the spoke 16 to secure the rim studs 22 to the wheel 11.

The tire supporting rim 12 is a multi-piece demountable type of rim 12 and includes a rim base 23, a lock ring 24, and a side ring 25. A rim clamp 26 having a plurality of non-threaded openings 26A is installed on the rim studs 22, and a rim nut 27 is installed on the threaded outer end 22B of each of the rim studs 22 to force the rim clamp 26 against the spoke 16 and the rim base 23 to thereby secure the rim 12 to the wheel 11. The tire supporting rim 12 defines an inboard tire bead seat retaining flange 12A, an inboard tire bead seat 12B, a generally axially extending well 12C, an outboard tire bead seat 12D, and an outboard tire bead seat retaining flange 12E.

The brake drum 13 includes a generally closed outer end 30, a transition section 31, a generally axially extending cylindrical main body 32 having an integral raised squealer band 32A, and an opened inner end 33. The closed end 30 of the brake drum 13 defines a drum mounting surface 30A which extends in a plane which is generally perpendicular to the wheel axis X. The closed end 30 of the brake drum 13 is provided with a centrally located wheel pilot 34 formed therein. A plurality of non-threaded lug bolt mounting holes 35 (only one lug bolt mounting holes 35 being shown), are formed in the brake drum 13 and are spaced circumferentially around the wheel pilot 34. A lug bolt 36 is provided and extends through each of the lug bolt mounting holes 35 and through a nonthreaded opening 15A formed in the outer portion 15 of the wheel 11. A nut 37 is installed on a threaded outer end of each of the lug bolts 36 to secure the brake drum 13 to the wheel 11 for rotation therewith. As mentioned above, the construction of the vehicle wheel and brake drum assembly 1 is conventional in the art.

Figure 2:
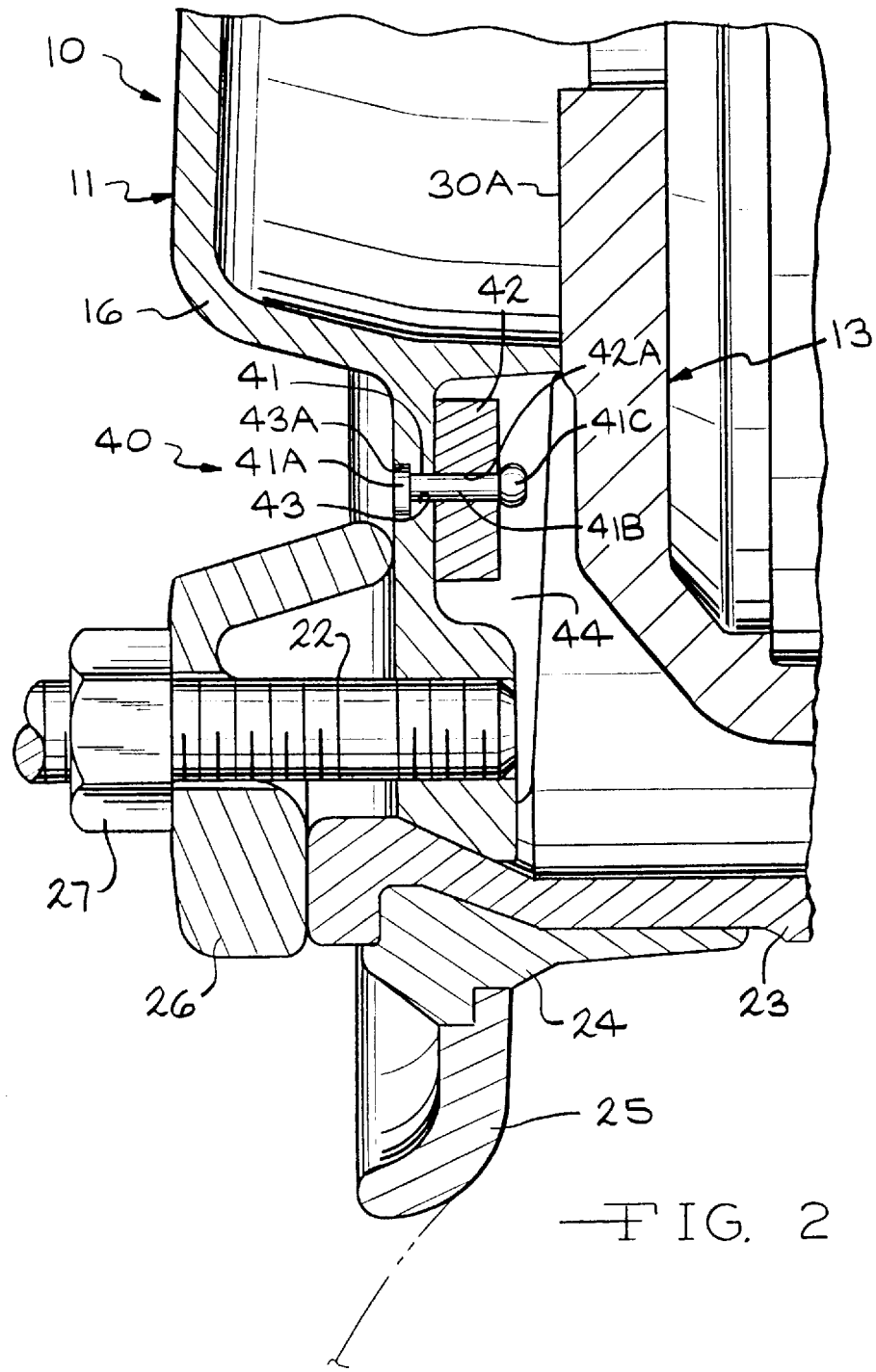
FIG. 2 is an enlarged sectional view of a portion of a vehicle wheel and brake drum assembly including a first embodiment of an improved vehicle wheel balance weight retention system in accordance with this invention.

Turning now to FIG. 2, there is illustrated a portion of a vehicle wheel and brake drum assembly 10 including a first embodiment of an improved vehicle wheel balance weight retention system, indicated generally at 40, in accordance with this invention. The structure of the vehicle wheel and brake drum assembly 10 is generally similar to the structure of the prior art assembly 1 described above, and like reference numbers are used to identify similar parts. As shown therein, the vehicle wheel balance weight retention system 40 includes a fastener 41 and a balance weight 42 which are secured to the wheel 11. In this embodiment, the fastener 41 is a rivet and includes an enlarged outer end 41A, a main body 41B, and a hammered or peened-over enlarged inner end 41C. The main body 41B of the rivet 41 extends through a non-threaded opening 42A formed in the balance weight 42, and through a non-threaded opening 43 formed in the spoke 16 of the wheel 11. In this embodiment, the non-threaded opening 43 is formed in a portion of the spoke 16 of the wheel 11 having a cavity 44 and includes a counterbore outer end 43A. For balancing purposes, the balance weight 42 is preferably positioned as close to the outer peripheral end of the spoke 16 as possible. Also, in order not to interfere with the mounting of the brake drum 13, it is preferable that the inner end 41C of the rivet 41 does not extend into the plane defined by the brake drum mounting surface 30A.

Figure 3:
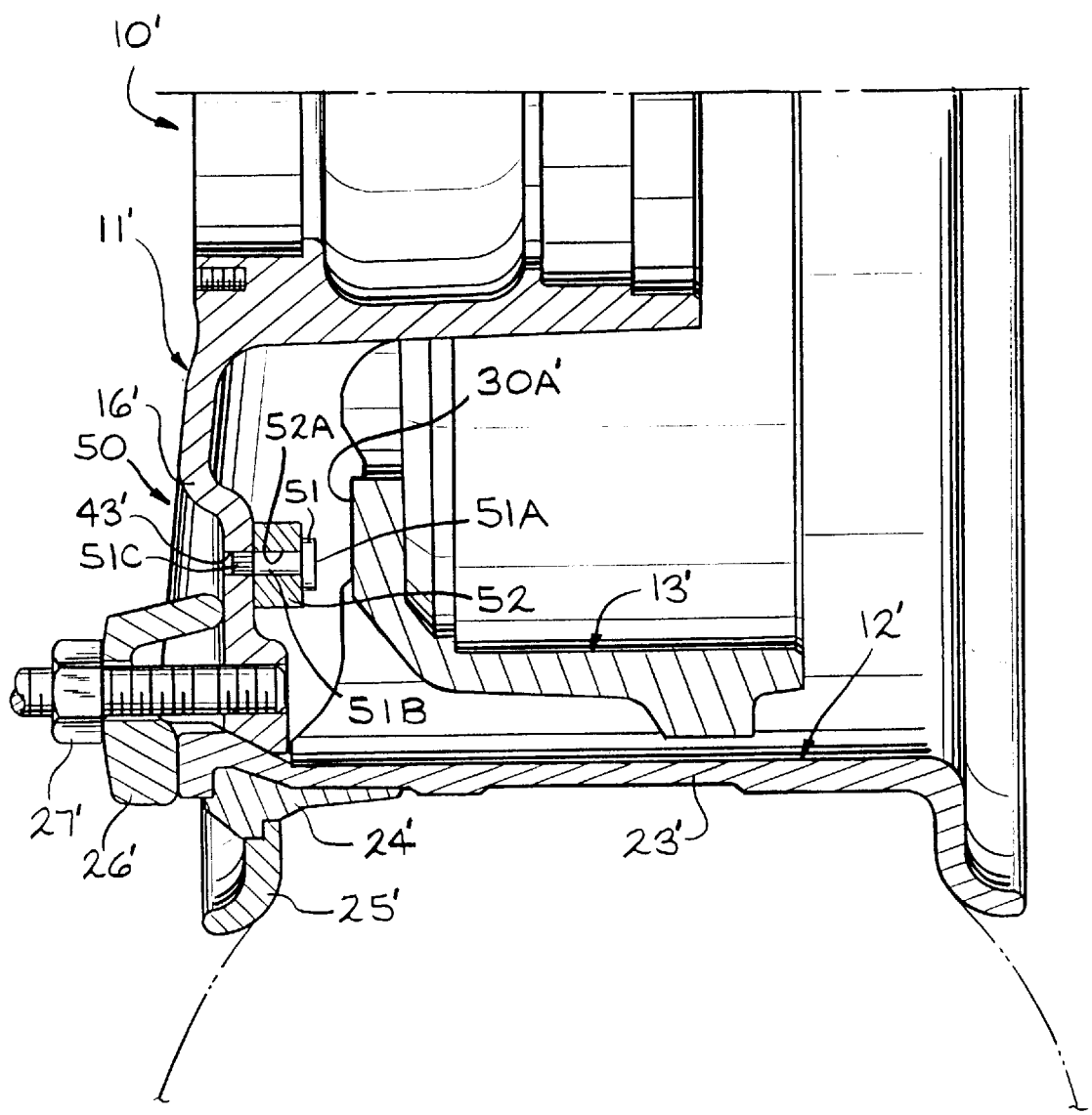
FIG. 3 is a sectional view of an alternate construction of a vehicle wheel and drum brake assembly and including a second embodiment of a vehicle wheel balance weight retention system in accordance with this invention.

FIG. 3 illustrates an alternate construction of a vehicle wheel and brake drum assembly, indicated generally at 10', including a second embodiment of a vehicle wheel balance weight retention system, indicated generally at 50, in accordance with this invention. The vehicle wheel and brake drum assembly 10' is similar to the vehicle wheel and brake drum assembly 10 illustrated in FIGS. 1 and 2 except that a spoke 16' of the wheel 11' does not include the inner cavity 44 shown therein.

As shown in this embodiment, the vehicle wheel balance weight retention system 50 includes a pin 51 and a balance weight 52. The pin 51 includes an enlarged head or inner end 51A and a main body 51B having serrations 51C formed along a portion thereof. The main body 51B of the rivet 51 extends through a non-threaded opening 52A formed in the balance weight 52 and into a non-threaded opening 43' formed in the spoke 16' of the wheel 11'. The serrations 51C of the pin 51 frictionally engage the side walls of the non-threaded opening 43' to secure the pin 51 and, therefore, the balance weight 52 to the wheel 11'.

Figure 4:
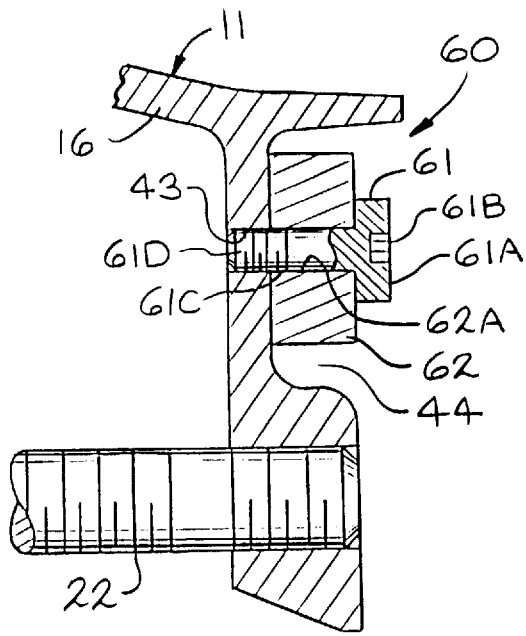
FIG. 4 is a sectional view of a third embodiment of a vehicle wheel balance weight retention system in accordance with this invention.

FIG. 4 illustrates a third embodiment of a vehicle wheel balance weight retention system, indicated generally at 60, in accordance with this invention. As shown therein, the vehicle wheel balance weight retention system 60 includes a screw 61 and a balance weight 62. The screw 61 includes an enlarged flat head or inner end 61A having an internal socket head 61B and a main body 61C having self-tapping threads 61D formed along an outer end portion thereof. The screw 61 is inserted through a non-threaded opening 62A formed in the balance weight 62, and into the non-threaded opening 43 formed in the spoke 16 of the wheel 11. The self-tapping threads 61D of the screw 61 are effective to secure the screw 61 and, therefore, the balance weight 62 to the wheel 11.

Figure 5:
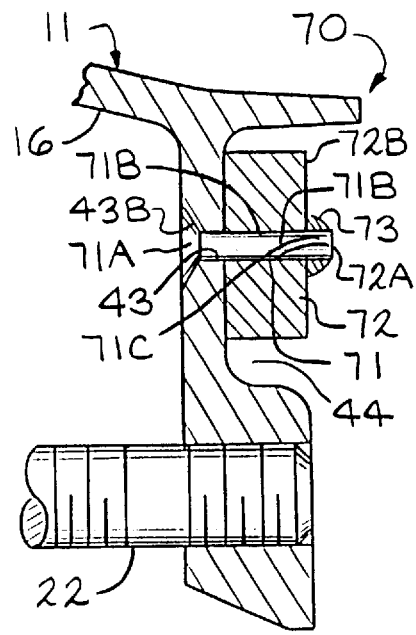
FIG. 5 is a sectional view of a fourth embodiment of a vehicle wheel balance weight retention system in accordance with this invention.

FIG. 5 illustrates a fourth embodiment of a vehicle wheel balance weight retention system, indicated generally at 70, in accordance with this invention. As shown therein, the vehicle wheel balance weight retention system 70 includes a pin 71 and a balance weight 72. In the illustrated embodiment, the pin 71 includes an enlarged countersink head or outer end 71A and a main body 71B. The pin 71 is inserted through a non-threaded opening 43 formed in the spoke 16 of the wheel 11 and through a non-threaded opening 72A formed in the balance weight 72 such that an inner end 71C of the pin 71 extends past an inner end surface 72B of the balance weight 72. The inner end 71C of the pin 71 is tack welded, as shown at 73, to secure the pin 71 and the balance weight 72 to the wheel 11. Alternatively, a suitable fastener, such as an E-clip (not shown), can be installed on the outer end 71C of the pin 71 adjacent the inner end surface 72B of the balance weight 72 to secure the pin 71 and the balance weight 72 to the wheel 11. Also, the opening 43 preferably includes a recessed outer end 43B which generally corresponds to the shape of the outer end 71A of the pin 71.

Figure 6:
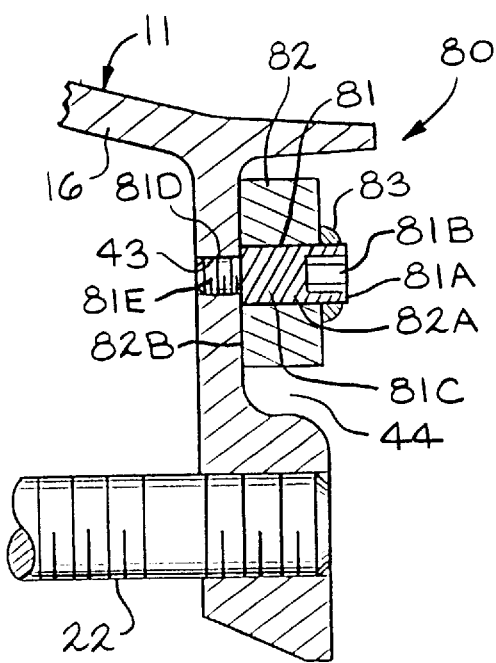
FIG. 6 is a sectional view of a fifth embodiment of a vehicle wheel balance weight retention system in accordance with this invention.

FIG. 6 illustrates a fifth embodiment of a vehicle wheel balance weight retention system, indicated generally at 80, in accordance with this invention. As shown therein, the vehicle wheel balance weight retention system 80 includes a screw 81 and a balance weight 82. In the illustrated embodiment, the screw 81 includes a enlarged head or inner end 81A having an internal socket head 81B, a main body 81C, and an outer end 81D having self-tapping threads 81E formed along a portion thereof. The screw 81 is inserted into the non-threaded opening 43 formed in the spoke 16 of the wheel 11 such that the self-tapping threads 81E of the screw 81 are effective to secure the screw 81 to the wheel 11. In this embodiment, a non-threaded opening 82A of the balance weight 82 is slightly larger than an outer diameter defined by the main body 81C of the screw 81. As a result, after the screw 81 is secured to the wheel 11, the balance weight 82 is slid over the inner end 81A of the screw 81 and advanced toward the outer end 81D thereof until an outer end surface 82B of the balance weight 82 contacts an inner surface of the cavity 44. The inner end 81A of the pin 81 is tack welded, as shown at 83, to secure the pin 81 and the balance weight 82 to the wheel 11.

Figure 7:
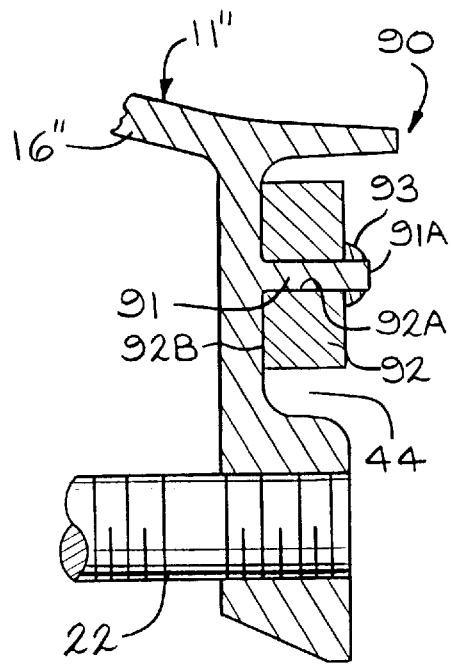
FIG. 7 is a sectional view of a sixth embodiment of a vehicle wheel balance weight retention system in accordance with this invention.

FIG. 7 illustrates a sixth embodiment of a vehicle wheel balance weight retention system, indicated generally at 90, in accordance with this invention. As shown therein, the vehicle wheel balance weight retention system 90 includes a generally axially extending stud or projection 91 which is formed integrally with the spoke 16 of the wheel 11 and a balance weight 92. The balance weight 92 is provided with a non-threaded opening 92A which is slightly larger then an outer diameter defined by the stud 91. As a result, the balance weight 92 is adapted to be slid over the stud 91 and advanced thereon until an outer end surface 92B of the balance weight 92 contacts an inner surface of the cavity 44. A tack weld 93 is then applied adjacent an inner end 91A of the stud 91 to secure the balance weight 92 to the stud 91, and therefore, to the wheel 11.

For balancing purposes, in all of the above embodiments, the associated balance weights 42, 52, 62, 72, 82, and 92 are preferably positioned as close to the outer end of the spoke of the wheel as possible. Also, in order that the vehicle wheel balance weight retention systems 40, 50, 60, 72, 82, and 92 of this invention do not interfere with the mounting of the associated brake drum 13, it is preferable that the inner end of the respective fasteners 41, 51, 61, 71, 81, and 91 do not extend into the plane defined by the mounting surface 30A of the brake drum 13.

Figure 10:
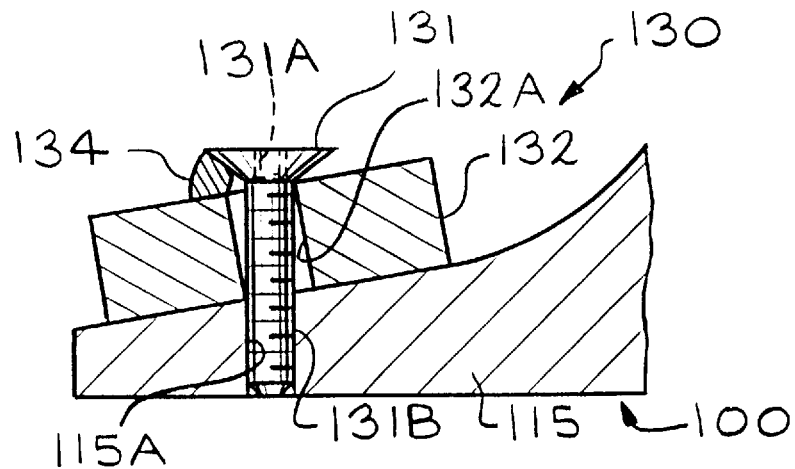
FIG. 10 is an enlarged sectional view of the vehicle hub balance weight retention system shown in FIGS. 8 and 9.

Referring to FIGS. 8 through 10, there is illustrated a vehicle hub, indicated generally at 100, including a first embodiment of a vehicle hub balance weight retention system, indicated generally at 130, in accordance with this invention. The hub 100 is adapted for use on a front axle of a heavy duty truck or tractor. However, it will be appreciated that the invention disclosed herein can be used in conjunction with other types of hub constructions, such as for example, a rear hub (not shown) or a multi-flanged hub (not shown).

The illustrated hub 100 is a cast or forged hub formed from a suitable material, such as nodular iron, and defines an axis of rotation Y. Alternatively, the hub 100 can be formed from other metals, such as for example steel, aluminum, or alloys thereof. The hub 100 includes an inner hub portion 114 and a generally radially extending outer hub portion 115. The inner hub portion 114 includes centrally located opening 117 formed therethrough to allow an axle spindle (not shown) to extend therethrough. The inner hub portion 114 is provided with an inner bearing seat 118 and an outer bearing seat 119. The bearing seats 118 and 119 receive a pair of bearings (not shown) for rotatably supporting the axle spindle.

The inner hub portion 114 further includes a plurality of threaded apertures 120 formed therein (only one aperture 120 is shown). A cover plate (not shown) is secured to the inner hub portion 114 of the hub 100 using fasteners (not shown) having threaded ends which are received in the threaded apertures 120.

The outer hub portion 115 includes a plurality of non-threaded apertures 121 formed therein. A lug mounting bolt (not shown) extends through each of the apertures 121 and through apertures formed in a brake component (not shown) and a wheel (not shown). A nut (not shown) is installed on a threaded end of each of the bolts to secure the hub 100, the brake component, and the wheel together for rotation with one another.

As best shown in FIG. 10, the vehicle hub balance weight retention system 130 includes a includes a screw 131 and a balance weight 132. The screw 131 includes an enlarged flat head having an internal socket head 131A, and a main body 131B having self-tapping threads. The screw 131 is inserted through a non-non-threaded opening 132A formed in the balance weight 132 into a threaded opening 115A formed in the outer hub portion 115. The self-tapping threads 131B of the screw 131 are effective to secure the screw 131 and the balance weight 132 to the hub 100. An optional tack weld 134 can be provided to positively lock the balance weight 132 in the position shown in FIG. 10. The non-threaded opening 115A extends generally parallel to the axis of rotation Y.

Figure 11:
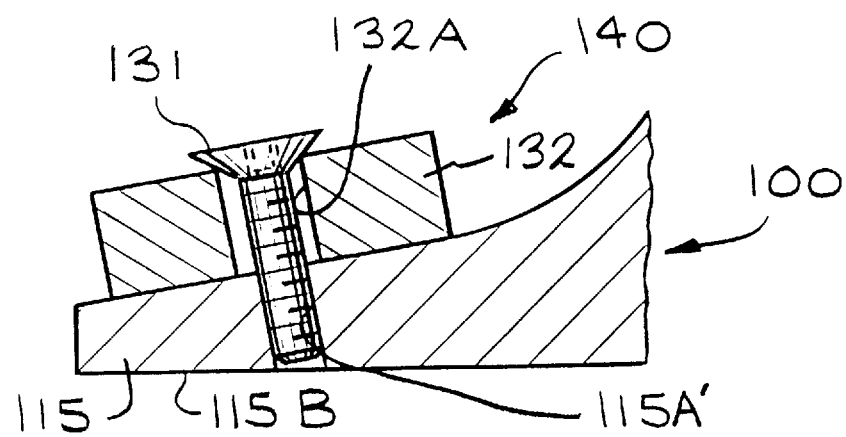
FIG. 11 is an enlarged sectional view of a second embodiment of a vehicle hub balance weight retention system in accordance with this invention.

FIG. 11 illustrates a second embodiment of a vehicle hub balance weight retention system, indicated generally at 140, in accordance with this invention.

The vehicle hub balance weight retention system 140 is similar to that illustrated in FIGS. 8 through 10 except that a non-threaded opening 115A' is formed in the outer hub portion 115 at an angle relative to an outer surface 115B of the hub 100.

Figure 12:
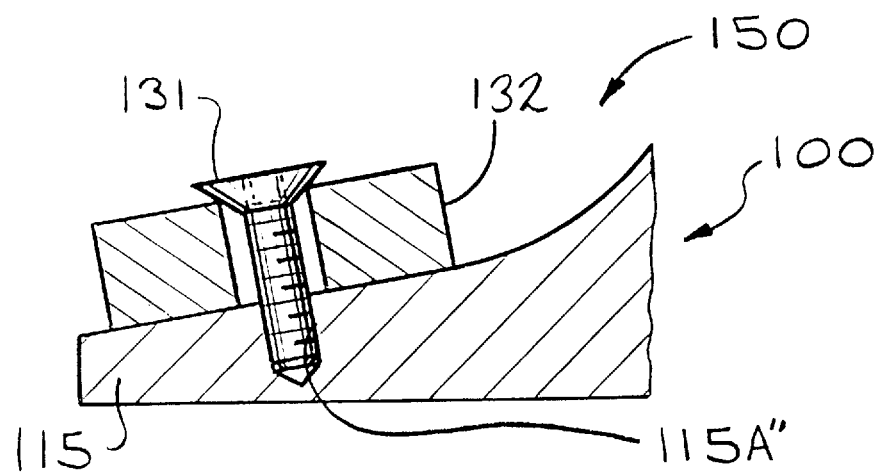
FIG. 12 is an enlarged sectional view of a third embodiment of a vehicle hub balance weight retention system in accordance with this invention.

FIG. 12 illustrates a third embodiment of a vehicle hub balance weight retention system, indicated generally at 150, in accordance with this invention. The vehicle hub balance weight retention system 150 is similar to that illustrated in FIG. 11 except that a non-threaded opening 115A" extends only partially into the outer hub portion 115.

Figure 13:
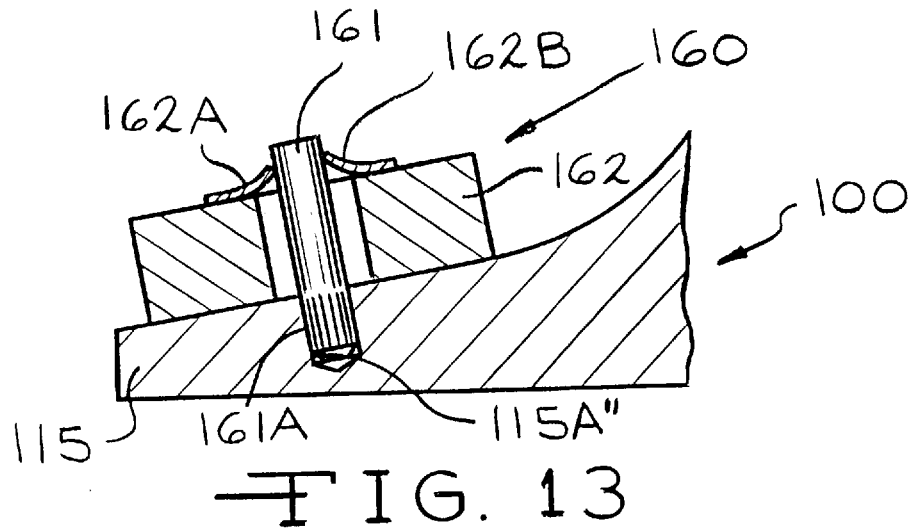
FIG. 13 is an enlarged sectional view of a fourth embodiment of a vehicle hub balance weight retention system in accordance with this invention.

FIG. 13 illustrates a fourth embodiment of a vehicle hub balance weight retention system, indicated generally at 160, in accordance with this invention. The vehicle hub balance weight retention system 160 includes a pin 161 and a balance weight 162. The pin 161 includes a main body having serrations 161A formed along a portion thereof. The balance weight 162 is provided with integral locking tabs 162B. The pin 161 extends through a non-threaded opening 162A formed in the balance weight 162 into a non-threaded opening 115A" formed in the outer hub portion 115. As a result, the locking tabs 162B are effective to secure balance weight to the pin 161, and the serrations 161A frictionally engage the side walls of the non-threaded opening 11SA" to secure the pin 161 and, therefore, the balance weight 162 to the hub 100.

Figure 14:
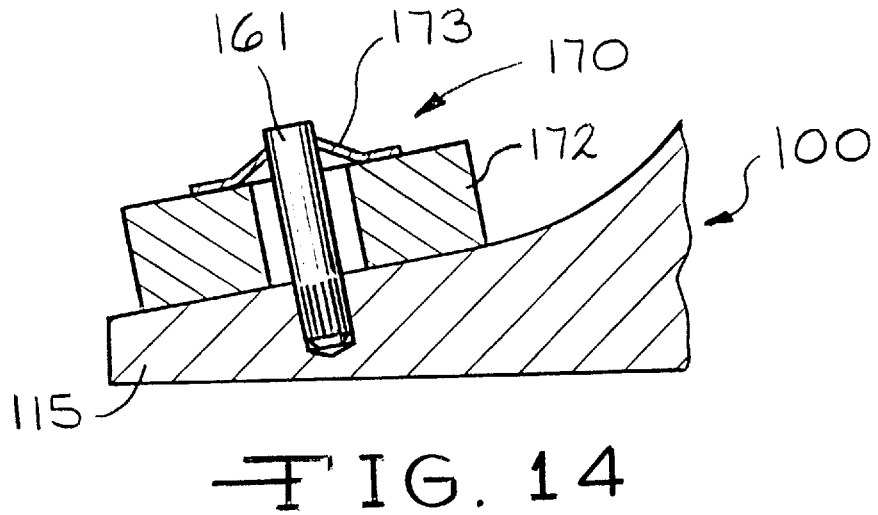
FIG. 14 is an enlarged sectional view of a fifth embodiment of a vehicle hub balance weight retention system in accordance with this invention.

FIG. 14 illustrates a fifth embodiment of a vehicle hub balance weight retention system, indicated generally at 170, in accordance with this invention. The vehicle hub balance weight retention system 170 is similar to that disclosed in FIG. 13, except that a separate locking device 173 is used to secure the pin 163 to the balance weight 172. The locking device 173 can be any suitable type of fastener device, such as an E-clip type of fastener.

Figure 15:
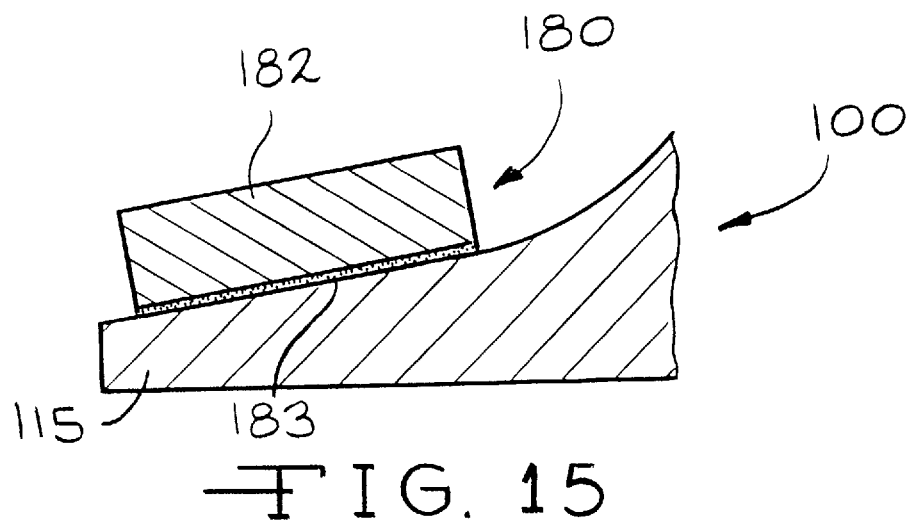
FIG. 15 is an enlarged sectional view of a sixth embodiment of a vehicle hub balance weight retention system in accordance with this invention.

FIG. 15 illustrates a sixth alternate embodiment of a vehicle hub balance weight retention system, indicated generally at 180, in accordance with this invention. The vehicle hub balance weight retention system 180 includes a balance weight 182 which is attached to the outer hub portion 115 by suitable means 183, such as by glue or other adhesive means.

Although the structures of the vehicle wheel balance retention systems 40, 50, 60, 70, 80, and 90, and the vehicle hub balance weight retention systems 130, 140, 150, 160, 170, and 180 of this invention have been described and illustrated as having the particular kinds of fasteners and balance weights disclosed herein, it will be appreciated that the fasteners and balance weights can be other than illustrated and described herein. Also, while the vehicle wheel balance retention systems 40, 50, 60, 70, 80, and 90, have been described and illustrated in connection with a wheel, these systems can be used in connection with a hub. In addition, while the vehicle hub balance weight systems 130, 140, 150, 160, 170, and 180 have been described and illustrated in connection with a hub, these systems can be used in connection with a wheel.

Also, while this invention has been described and illustrated in connection with the particular vehicle wheel and drum brake assembly disclosed herein, the vehicle wheel balance weight retention system of this invention can be used in connection with other kinds of vehicle wheels and/or other kinds of drum and disc brake assemblies. For example, the vehicle wheel balance weight retention system can be used with a full face vehicle wheel (not shown), a bead seat attached wheel (not shown), a well attached wheel (not shown), a full cast wheel (not shown), or a modular wheel having a partial rim and a cast wheel disc.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle wheel and balance weight retention system comprising:

a vehicle wheel defining a wheel axis and including an inner portion and a generally radially extending outer portion, said outer portion including a plurality of spokes, at least one of said plurality of spokes having an opening formed therethrough, said opening extending through said spoke from an inner surface to an outer surface thereof, said at least one of said plurality of spokes provided with an internal cavity adjacent said opening at said inner surface thereof;

a balance weight having an opening formed therethrough extending from an outer surface to an inner surface thereof, said balance weight disposed in said internal cavity of said spoke of said vehicle wheel; and a fastener extending through at least a portion of said opening of said spoke and said opening of said balance weight to thereby secure said balance weight to said spoke of said vehicle wheel.

2. The vehicle wheel and balance weight retention system defined in claim 1 wherein said opening formed through said spoke includes a counterbore formed adjacent said outer surface thereof.

3. The vehicle wheel and balance weight retention system defined in claim 1 wherein said vehicle wheel is a steel vehicle wheel.

4. The vehicle wheel and balance weight retention system defined in claim 1 wherein said vehicle wheel is a nodular iron vehicle wheel.

5. The vehicle wheel and balance weight retention system defined in claim 1 wherein said opening formed through said spoke extends generally parallel to said wheel axis.

6. The vehicle wheel and balance weight retention system defined in claim 1 wherein said fastener is a rivet.

7. The vehicle wheel and balance weight retention system defined in claim 1 wherein said opening in said spoke is threaded, and said fastener is a threaded fastener.

8. The vehicle wheel and balance weight retention system defined in claim 1 wherein said fastener is a screw provided with self-tapping threads.

9. The vehicle wheel and balance weight retention system defined in claim 1 wherein said fastener is a pin.

10. The vehicle wheel and balance weight retention system defined in claim 9 wherein said pin includes an exposed end which is welded to thereby secure said balance weight to said spoke of said vehicle wheel.

11. The vehicle wheel and balance weight retention system defined in claim 9 wherein said pin includes a serrated end which is operative to secure said balance weight to said spoke of said vehicle wheel.

12. A vehicle wheel and balance weight retention system comprising:

a vehicle wheel defining a wheel axis and including an inner portion and a generally radially extending outer portion, said outer portion including a plurality of spokes, at least one of said plurality of spokes having an opening formed therethrough, said opening extending through said spoke from an inner surface to an outer surface thereof, said at least one of said plurality of spokes provided with an internal cavity adjacent said opening at said inner surface thereof;

a balance weight having an opening formed therethrough extending from an outer surface to an inner surface thereof, said balance weight disposed in said internal cavity of said spokes of said vehicle wheel; and a fastener extending through at least a portion of said opening of said spoke and said opening of said balance weight to thereby secure said balance weight to said spoke of said vehicle wheel;

wherein said opening formed through said spoke extends generally parallel to said wheel axis and said opening formed through said balance weight extends generally parallel to said wheel axis.

13. The vehicle wheel and balance weight retention system defined in claim 12 wherein said opening formed through said spoke includes a counterbore formed adjacent said outer surface thereof.

14. The vehicle wheel and balance weight retention system defined in claim 12 wherein said vehicle wheel is a steel vehicle wheel.

15. The vehicle wheel and balance weight retention system defined in claim 12 wherein said vehicle wheel is a nodular iron vehicle wheel.

16. The vehicle wheel and balance weight retention system defined in claim 12 wherein said fastener is a rivet.

17. The vehicle wheel and balance weight retention system defined in claim 12 wherein said opening in said spoke is threaded, and said fastener is a threaded fastener.

18. The vehicle wheel and balance weight retention system defined in claim 12 wherein said fastener is a screw provided with self-tapping threads.

19. The vehicle wheel and balance weight retention system defined in claim 12 wherein said fastener is a pin.

20. The vehicle wheel and balance weight retention system defined in claim 19 wherein said pin includes an exposed end which is welded to thereby secure said balance weight to said spoke of said vehicle wheel.

* * * * *